US011430424B2

(12) United States Patent
Wolf et al.

(10) Patent No.: US 11,430,424 B2
(45) Date of Patent: Aug. 30, 2022

(54) GENERATING A VOICE MODEL FOR A USER

(71) Applicant: Meta Platforms Technologies, LLC, Menlo Park, CA (US)

(72) Inventors: Lior Wolf, Herzliya (IL); David Vazquez, Fairfax, CA (US); Tali Zvi, San Carlos, CA (US); Yaniv Nechemia Taigman, Batzra (IL); Adam Polyak, Ness Ziona (IL); Hyunbin Park, Palo Alto, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 112 days.

(21) Appl. No.: 16/682,941

(22) Filed: Nov. 13, 2019

(65) Prior Publication Data
US 2021/0142782 A1    May 13, 2021

(51) Int. Cl.
| | | |
|---|---|---|
| *G10L 13/033* | (2013.01) | |
| *G10L 13/10* | (2013.01) | |
| *G10L 13/047* | (2013.01) | |
| *G06N 3/04* | (2006.01) | |
| *G06N 3/08* | (2006.01) | |
| *G10L 13/08* | (2013.01) | |

(52) U.S. Cl.
CPC ............. *G10L 13/047* (2013.01); *G06N 3/04* (2013.01); *G06N 3/08* (2013.01); *G10L 13/033* (2013.01); *G10L 13/08* (2013.01)

(58) Field of Classification Search
CPC ......... G10L 15/00; G10L 15/02; G10L 13/00; G10L 13/10; G10L 13/033
See application file for complete search history.

(56) References Cited

U.S. PATENT DOCUMENTS

| | | | |
|---|---|---|---|
| 2018/0211649 A1* | 7/2018 | Li | .................. G06F 40/169 |
| 2018/0254034 A1* | 9/2018 | Li | .................. G10L 15/183 |
| 2018/0336880 A1 | 11/2018 | Arik et al. | |
| 2019/0251952 A1* | 8/2019 | Arik | ................ G10L 13/033 |
| 2020/0005763 A1* | 1/2020 | Chae | ................. G10L 15/02 |

(Continued)

FOREIGN PATENT DOCUMENTS

| | | |
|---|---|---|
| KR | 20190085882 | 7/2019 |
| KR | 20190104269 A | 9/2019 |

OTHER PUBLICATIONS

Adam Polyak et al.: "TTS Skins: Speaker Conversion via ASR", srxiv.org, Cornell University Library, 201 Olin Library Cornell University Ithaca, NY 14853, Apr. 18, 2019 (Apr. 18, 2019).

(Continued)

*Primary Examiner* — Shreyans A Patel
(74) *Attorney, Agent, or Firm* — Foley & Lardner LLP

(57) ABSTRACT

Disclosed herein a system, a method and a device for generating a voice model for a user. A device can include an encoder and a decoder to generate a voice model for converting text to an audio output that resembles a voice of the person sending respective text. The encoder can includes a neural network and can receive a plurality of audio samples from a user. The encoder can generate a sequence of values and provide the sequence of values to the decoder. The decoder can establish, using the sequence of values and one or more speaker embeddings of the user, a voice model corresponding to the plurality of audio samples of the user.

20 Claims, 5 Drawing Sheets

(56) References Cited

U.S. PATENT DOCUMENTS

| | | | | |
|---|---|---|---|---|
| 2020/0005764 A1* | 1/2020 | Chae | ........................ | G10L 13/10 |
| 2020/0051545 A1* | 2/2020 | Iwase | ....................... | G10L 15/16 |
| 2020/0211528 A1* | 7/2020 | Lee | ........................ | G06N 3/084 |
| 2020/0265829 A1* | 8/2020 | Liu | ........................ | G10L 13/033 |
| 2021/0097976 A1* | 4/2021 | Chicote | ................... | G06F 40/30 |

OTHER PUBLICATIONS

Adam Polyak et al.: "TTS Skins: Speaker Conversion via ASR", arxiv.org, Cornell University Library, 201 Olin Library Cornell University Ithaca, NY 14853, Jul. 26, 2020 (Jul. 26, 2020).

Erica Cooper et al.: "Zero-Shot Multi-Speaker Text-to-Speech With State-of-the-Art Neural Speaker Embeddings", arxiv.org, Cornell University, 201 Olin Library Cornell University Ithaca, NY 14853, Oct. 24, 2019 (Oct. 24, 2019).

International Search Report and Written Opinion on related matter on PCT/US2020/055619 dated Jan. 27, 2021.

Younggun Lee et al: "Voice Imitating Text-to-Speech Neural Networks", arxiv.org, Cornell University Library, 201 Olin Library Cornell University Ithaca, NY 14853 Jun. 4, 2018 (Jun. 4, 2018).

\* cited by examiner

GENERATING A VOICE MODEL FOR A USER

FIELD OF DISCLOSURE

The present disclosure is generally related to messaging systems and methods, including but not limited to systems and methods for generating a voice model to convert a text input to a synthetic audio output corresponding to the user's voice.

BACKGROUND

In messaging technologies, asynchronous text messaging can be an integral method of communication for a large portion of the population. However, messaging in a hands-free or eyes-free setting can be limited, dangerous or disruptive for a user receiving the message. The interactions between the user receiving the message and the messaging system can include multi-turn interactions to identify a sender of the message. For example, the user, upon receiving the message, may need to interact with the messaging system (e.g., mobile device, handheld device) multiple times to identify the sender or person transmitting the respective message. In situations, such as group chats, this can create a time delay and cognitive delay as the user receiving the message performs a back and forth with the messaging system to identify or differentiate between the different potential senders in the group chat. Thus, such interaction can disrupt a current activity the user is involved with or create a dangerous situation as the user's attention is taken away from a current activity (e.g., driving a car) to interact with the messaging system.

SUMMARY

Devices, systems and methods for generating a voice model (e.g., voice avatar) for a user are provided herein. The voice model can be used to convert a text input (e.g., text message) into a synthetic audio output that correspond to (e.g., resemble, sounds like) a voice of the person sending the respective text input. The voice model can create text to speech digital clones of one or more users' voices to read and recite back messages in situations or environments in which reading back the respective message is limited or not possible, so as to provide a personal and familiar interaction between the person receiving the message and the person sending the message. For example, the voice model can be generated and further trained using audio samples provided by the respective user to obtain voice characteristics and train a neural network model such that the audio outputs generated by the voice model resembles the respective user's voice. The voice model can be generated by a device having an encoder-decoder architecture. The encoder-decoder architecture can allow the device to receive and process audio samples from a user, apply one or more speaker embeddings to the audio samples and generate a voice model that resembles the respective user. The voice model can generate a unique voice avatar for the user to identify the respective user based in part on the sound of the user's voice avatar, to render an audio output corresponding to a message to a person receiving the message from the user, therefore reducing the number of communications used to identify a sender of the message, and/or eliminate pre-ambles used to identify the sender of a message.

In at least one aspect, a method is provided. The method can include receiving, by an encoder that comprises a neural network, a plurality of audio samples from a user. The method can include receiving, by a decoder from the encoder, the sequence of values. The method can include establishing, by the decoder using the sequence of values and one or more speaker embeddings of the user, a voice model corresponding to the plurality of audio samples of the user.

In some embodiments, the method can include establishing the voice model as a machine learning model and generating, using the voice model and input text from the user, a synthetic audio output for the user. The method can include receiving input text from the user, identifying the voice model for the user and at least one of the one or more speaker embeddings of the user and converting, using the voice model and the at least one of the one or more speaker embeddings, the input text to a synthetic audio output to model a voice of the user. The method can include training, by the decoder, the voice model for the user using the one or more speaker embeddings and one or more subsequent audio samples from the user. The method can include applying, by the decoder, the one or more speaker embeddings of the user to the sequence of values to generate a conditioning signal, and providing, by the decoder, the conditioning signal to a plurality of residual layers to establish the voice model.

The method can include modifying, by the encoder, a sampling rate of the plurality of audio samples via at least one convolutional layer of at least one convolutional block of the neural network of the encoder. The method can include providing one or more subsequent audio samples from the user to a first residual layer and a second residual layer of a neural network of the decoder, and providing the one or more speaker embeddings to the first residual layer and the second residual layer of the neural network of the decoder, wherein an output from the first residual layer is provided to an input of the second residual layer to train the voice model for the user. In embodiments, the decoder can include a neural network that includes at least two fully connected residual layers and a normalization function. The method can include applying, by the decoder, a normalization function to an output of a plurality of residual layers of a neural network of the decoder to establish the voice model.

In at least one aspect, a device is provided. The device can include an encoder implemented using at least one processor. The encoder can be configured to receive a plurality of audio samples from a user and provide the plurality of audio samples to a neural network of the encoder to generate a sequence of values corresponding to outputs from one or more convolutional layers of the neural network. The device can include a decoder implemented using the at least one processor. The decoder can be configured to receive, from the encoder, the sequence of values and establish, using the sequence of values and one or more speaker embeddings of the user, a voice model corresponding to the plurality of audio samples of the user.

The device can be further configured to establish the voice model as a machine learning model, and generate, using the voice model and input text from the user, a synthetic audio output for the user. The device can be further configured to receive input text from the user, identify the voice model for the user and the one or more speaker embeddings of with the user, and convert, using the voice model and the one or more speaker embeddings, the input text to a synthetic audio output to model a voice of the user. The device can be further configured to train the voice model for the user using the one or more speaker embeddings and one or more subsequent audio samples from the user.

In some embodiments, the encoder can be further configured to apply the one or more speaker embeddings of the user to the sequence of values to generate a conditioning signal and provide the conditioning signal to a plurality of residual layers to establish the voice model. The encoder can be further configured to modify a sampling rate of the plurality of audio samples via at least one convolutional layer of at least one convolutional block of the neural network of the encoder. The device can be further configured to provide one or more subsequent audio samples from the user to a first residual layer and a second residual layer of a neural network of the decoder, and provide the one or more speaker embeddings to the first residual layer and the second residual layer of the neural network of the decoder. In certain embodiments, an output from the first residual layer can be provided to an input of the second residual layer to train the voice model for the user. The decoder can include a neural network that includes at least two fully connected residual layers and a normalization function.

In at least one aspect, a non-transitory computer readable medium storing instructions is provided. The instructions when executed by one or more processors can cause the one or more processors to receive a plurality of audio samples from a user. The instructions when executed by one or more processors can cause the one or more processors to provide the plurality of audio samples to a neural network to generate a sequence of values corresponding to outputs from one or more convolutional layers of the neural network. The instructions when executed by one or more processors can cause the one or more processors to establish, using the sequence of values and one or more speaker embeddings of the user, a voice model corresponding to the plurality of audio samples of the user.

In embodiments, the instructions when executed by one or more processors can cause the one or more processors to establish the voice model as a machine learning model. The instructions when executed by one or more processors can cause the one or more processors to generate, using the voice model and text input from the user, a synthetic audio output for the user. The instructions when executed by one or more processors can cause the one or more processors to receive input text from the user. The instructions when executed by one or more processors can cause the one or more processors to identify the voice model for the user and at least one of the one or more speaker embeddings of the user. The instructions when executed by one or more processors can cause the one or more processors to convert, using the voice model and the at least one of the one or more speaker embeddings, the input text to a synthetic audio output to model a voice of the user.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
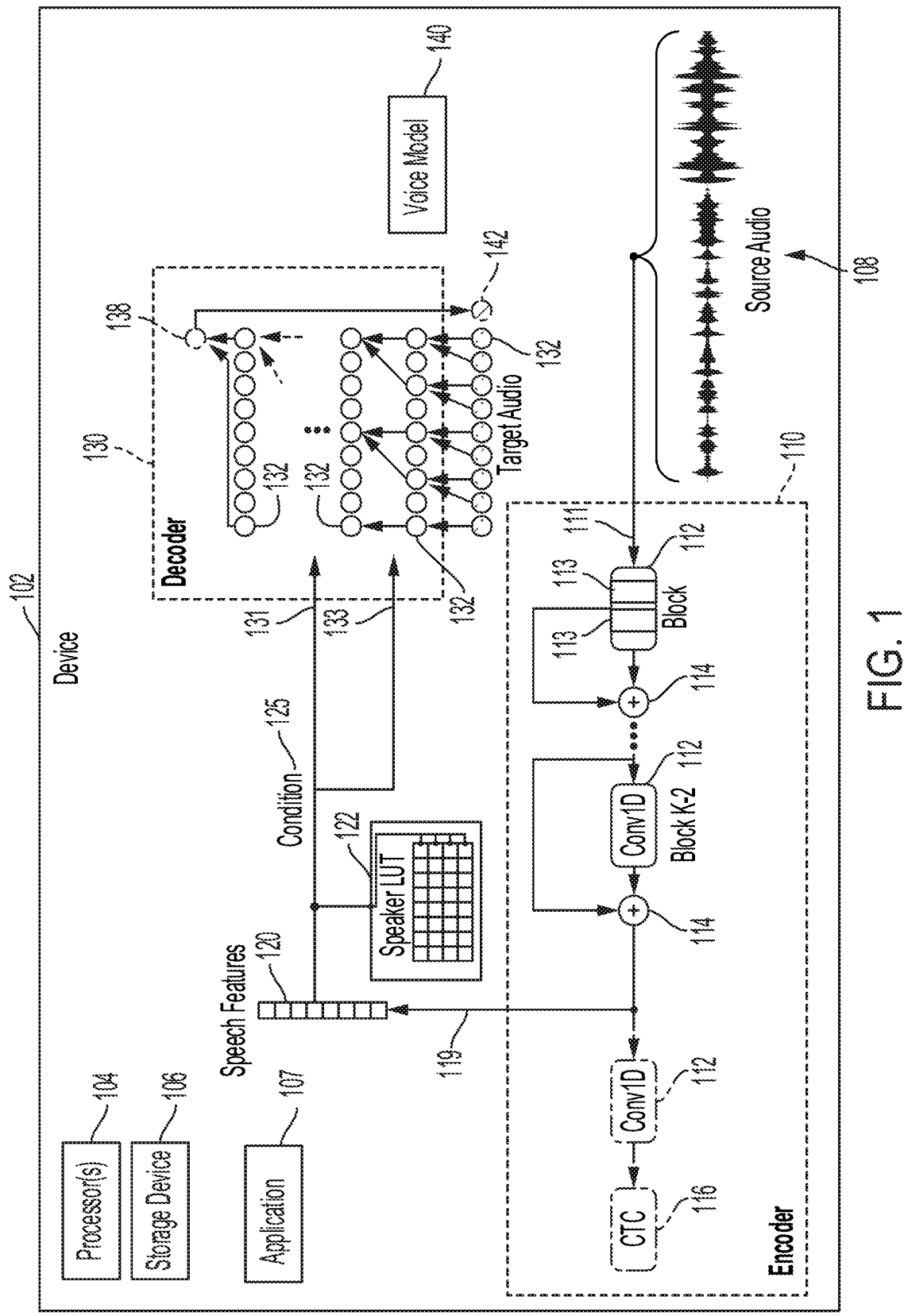
FIG. 1 is a block diagram of an embodiment of a system for generating a voice model for a user, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes embodiments of devices, systems and methods for generating a voice model for a user.

Section B describes embodiments of a computing system.

A. Generating a Voice Model for a User

The subject matter of this disclosure is directed to generating a voice avatar (e.g., voice model) for a user that is a clone of, mimics or resembles the user's voice. The voice avatar can be used to recite, render or read back messages (e.g., text, or speech to text, generated by the user) through an audio output that resembles the user's voice. The voice avatar can be generated based upon samples or recording received from the user (e.g., used to obtain voice characteristics to train a neural network model corresponding to the voice avatar) such that the voice avatar resembles the respective user's voice. In messaging technology, hands-free or eyes free settings can be limited, and are dangerous or disruptive to users, for example, when interacting with a device to receive and/or send a message. For example, the interaction may include communicating through a computer based voice system or artificial voice system that provides a generic voice or sound (e.g., a voice assistant's voice) that is not associated with or does not resemble the user's own voice. Thus, an individual receiving the message may need to identify the sender of the message. Further, in situations such as group chats with multiple participants, there can be additional delay and/or effort to identify the sender(s) of individual messages at an end device.

The devices, systems and methods described herein can generate a voice avatar for a user such that a message sent from the user can be read or played via an audio output using a voice avatar (e.g., real-time generated voice, based on a text-to-generic-way and generic-way-to-avatar-way translation process using a trained neural network model) corresponding to the voice of the respective user. The individual receiving the message can identify the user through the sound and/or quality of the voice (e.g., immediate recognition of the user's voice) and provide a more meaningful, personal and expressive message or signal.

To generate a personalized voice avatar, a user can opt-in, authorize or request to record acoustic data or voice samples that are used to train or generate a model of the users voice. The user can be provided a plurality of test sentences or phrases to be read into a recording device through a user interface. The user can recite an initial test sentence to verify the quality of the speech prior to beginning the recording. The quality of the speech can be verified based in part on characteristics or properties of the speech, such as but not limited to, volume, tone, pitch, length and/or speed. The quality can be presented to the user through the user interface to indicate whether the quality of the speech is good and meets minimum requirements or if the test sentences should be re-recorded. A determined number of test messages (which may or may not be standardized) can be provided to the user to generate the voice model for the user. For example, the determined number of test messages can be selected or acquired based in part on a total number of sentences or words and/or a length of time to recite the respective test messages.

Once the user has completed reciting the test message, the system can generate the voice model responsive to the user completing the determined number of test messages. For example, the voice model can be trained using the recorded test messages from the user and once the determined number of test messages are recorded, analyzed and/or processed, the voice model can build a personalized voice model for the user corresponding to the unique voice avatar. The voice model can be trained and can generate the voice avatar for the user based in part on voice embeddings of the user and the properties of the user's own voice. The system can include an encoder-decoder architecture to generate the voice model. The encoder portion can be trained to obtain automatic speech recognition (ASR) features and the decoder portion can reconstruct an original signal (e.g., voice sample) based on the representation provided by the encoder and a desired speaker embedding provided by a lookup table. The voice model can correspond to a voice avatar for the user, such that the voice avatar's audio output resembles the user's voice but can be identified as not real or not actually the corresponding user speaking. For example, the voice avatar's audio output can be generated having a determined quality level to identify the user to an individual receiving the message, and to allow the individual receiving the message to identify the voice of the voice avatar as being synthetic or not real. The determined quality level can be selected to protect against deepfakes, plagiarism and/or impersonation. The user can update or provide more voice data to update or improve the respective voice model and update the voice avatar for the respective user. Thus, the voice model can generate a unique voice avatar for a user that can identify the respective user based in part on the sound of the user's voice avatar, to reduce or streamline the number of communications used to identify a sender of a message, or to eliminate preambles used to identify the sender of a message.

Referring now to FIG. 1, an example system 100 for generating a voice model 140 that corresponds to, sounds like, or resembles a user's voice, is provided. In brief overview, a device 102 can include an encoder 110 and a decoder 130 to receive and process a plurality of audio samples 108 received from a user, and generate a voice model 140 that resembles the user's voice. For example, the encoder 110 can form a first portion of the device 102, and can receive and process the plurality of audio samples 108. The decoder can form a second portion of the device 102 and can receive and process an output (e.g., sequence of values 119) from the encoder 110 and one or more speaker embeddings 124 from a lookup table 122 of the device 102 to generate or establish the voice model 140.

Figure 3:
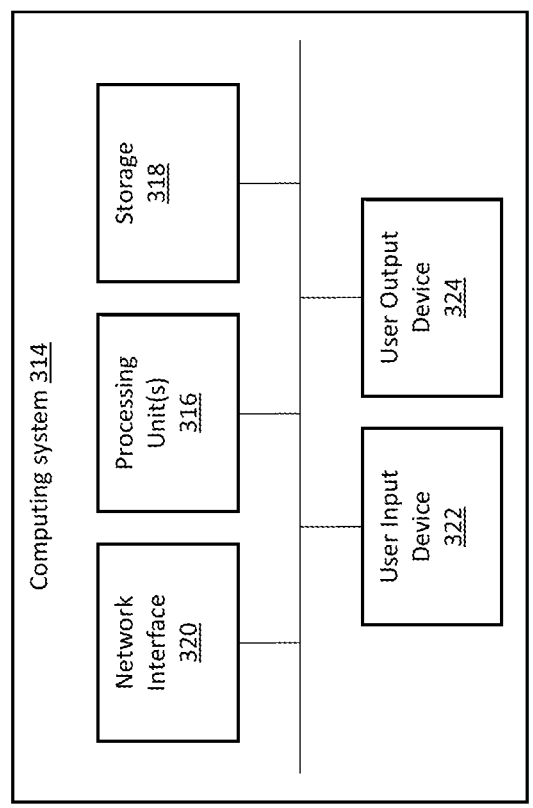
FIG. 3 is a block diagram of a computing environment according to an example implementation of the present disclosure.

Various components and elements of the system 100 may be implemented on or using components or elements of the computing environment shown in FIG. 3 and subsequently described. For instance, the device 102, encoder 110 and decoder 130 may include or incorporate a computing system similar to the computing system 314 shown in FIG. 3 and subsequently described. The device 102, encoder 110 and decoder 130 may include one or more processing unit(s) 316, storage 318, a network interface 320, user input device 322, and/or user output device 324.

The device 102 can include a computing system or WiFi device. The device 102 can include a messaging system or a text to speech (TTS) system to convert a text input into a synthetic audio output 142. In some embodiments, the device 102 can be implemented, for example, as a wearable computing device (e.g., smart watch, smart eyeglasses, head mounted display), smartphone, other mobile phone, device (e.g., consumer device), desktop computer, laptop computer, a virtual reality (VR) puck, a VR personal computer (PC), VR computing device, a head mounted device, or implemented with distributed computing devices. The device 102 can be implemented to provide VR, augmented reality (AR), and/or mixed reality (MR) experience. In some embodiments, the device 102 can include conventional, specialized or custom computer components such as processors 104, a storage device 106, a network interface, a user input device, and/or a user output device. In embodiments, the device 102 may include some elements of the device shown in FIG. 3 and subsequently described.

The device 102 can include one or more processors 104. The one or more processors 104 can include any logic, circuitry and/or processing component (e.g., a microprocessor) for pre-processing input data (e.g., audio samples 108, speaker embeddings 124) for the device 102, encoder 110 and/or decoder 130, and/or for post-processing output data for the device 102, encoder 110 and/or decoder 130. The one or more processors 104 can provide logic, circuitry, processing component and/or functionality for configuring, controlling and/or managing one or more operations of the device 102, encoder 110 and/or decoder 130. For instance, a processor 104 may receive data, including but not limited to, one or more audio samples 108 and generate a voice model 140 that resembles or corresponds to the respective audio samples 108.

The plurality of audio samples 108 can include recordings or audio samples provided to the device 102 by a user. For example, the audio samples 108 can include a plurality of test phrases recited into an input device (e.g., microphone, audio recording device) connected to the device 102. Test phrases can include, but not limited to, words, sounds, text, sentences, and/or phrases recited by the user. The test phrases can include predetermined or random test phrases. For example, the device 102 can provide the test phrases to the user though a user interface of the device 102 or connected to the device 102 and the user can recite the test phases or provide the test phrases in audio form to an audio collection device of the device 102, which may be connected to the device 102 for instance. The device 102 can present or provide the test phrases to the user in a determined order or randomly. The application can provide the test phrases one at a time, and the user can recite, sound out or speak back the test phrases, for example, into the audio collection device. The audio collection device can include, but not limited to, a microphone component of the device 102 or an external microphone connected to the device 102. In some embodiments, the test phrases can include or correspond to random test phrases generated by the user. For example, the device 102 can collect random test phrases provided by the user to the device 102 to an audio collection device of the device 102 or one connected to the device 102. The device 102 can collect and store the audio samples 108 corresponding to the test phrases in the storage device 106.

The device 102 can include an application 107. The application 107 can correspond to or include a client application executing on the device 102 to interact with a user to collect or record audio samples 108 provided by the user. The application 107 can include or be implemented in hardware, or at least a combination of hardware and software. The application 107 can provide one more test phrases to the user through a user interface, for the user to interact with and provide audio samples 108.

The device 102 can include an encoder 110. The encoder 110 can include or be implemented in hardware, or at least a combination of hardware and software. For example, the encoder 110 can include a device, a circuit, software or a combination of a device, circuit and/or software to convert data (e.g., audio samples 108) from one format to a second or different format. In some embodiments, the encoder 110 can include a neural network or be a component of a neural network to generate a sequence of values corresponding to outputs of one or more layers of the neural network. For example, the encoder 110 can include a deep time delay neural network (TDNN) having a plurality of blocks 112 of convolutional layers 113. For example, the encoder 110 can include a series of convolutional blocks 112 (e.g., multiple convolutional blocks, seven convolutional blocks, ten convolutional blocks, or some other number of convolutional blocks). In embodiments, each convolutional block 112 (e.g., one dimensional convolutional block) can include one or more convolutional layers 113. In some embodiments, each convolutional block 112 can include or be formed having five (or some other number of) convolutional layers 113. In embodiments, the encoder 110 may include some elements of the device shown in FIG. 3 and subsequently described.

The convolutional blocks 112 can be connected though one or more adders 114 to form a series of convolutional blocks 112. For example, a first convolutional block 112 can be connected to a second convolutional block 112 through at least one adder 114. The adder 114 can receive as a first input, an output of the previous convolutional block 112, and as a second input, an output of at least one convolutional layer 113 of the previous convolutional block 112. The adder 114 can combine the output of the previous convolutional block 112 and the output of at least one convolutional layer 113 of the previous convolutional block 112 to generate a combined output. The adder 114 can provide the combined output from the previous convolutional block 112 to an input of a next or subsequent convolutional block 112 of the series of convolutional blocks 112 of the encoder 110.

The convolutional layers 113 can include or correspond to components of a neural network of the encoder 110. The convolutional layers 113 can include a plurality of weights and/or biases to process received audio samples 108. For example, the convolutional layers 113 can convolve or take a dot product of spatial locations corresponding to or from the received audio sample 108 to generate a sequence of values or modified audio samples 108 (e.g., different from the original or received form). In some embodiments, the two or more convolutional layers 113 can be connected such that an output of a first convolutional layer 113 can be provided as input to a second or subsequent convolutional layer 113 of the encoder 110 to generate a sequence of values corresponding to an output of the encoder 110. The convolutional layers 113 can include, but not limited to, one dimensional (1-D) convolutional layers. The convolutional layers 113 can include, but is not limited to, a sequence of a convolutional operation, a batch normalization, a clipped ReLU activation and/or a dropout function. The convolutional layers 113 can include or be implemented in hardware, or at least a combination of hardware and software. For example, the convolutional layers can include a device, a circuit, software or a combination of a device, circuit and/or software to process audio samples 108 for the encoder 110.

The encoder 110 can include a connectionist temporal classification (CTC) 116. The CTC 116 can include or provide loss function to an output generated by the plurality of convolutional blocks 112 and convolutional layers 113 to label, score and/or train the neural network of the encoder 110. For example, the CTC 616 can label or classify outputs from the plurality of convolutional blocks 112 and convolutional layers 113 and provide the labels or classifications back the neural network to update or train weights of the encoder 110 such that subsequent and/or future audio samples 108 provided to the encoder can be used to train the neural network based in part on the labels or classifications from previous audio samples 108 and properties of the subsequent and/or future audio samples 108. The CTC 116 can include or be implemented in hardware, or at least a combination of hardware and software. For example, the CTC 116 can include a device, a circuit, software or a combination of a device, circuit and/or software to process outputs from the convolutional blocks 112 and the convolutional layers 113.

The series of convolutional blocks 112 can generate a sequence of values 119 corresponding to outputs from one or more convolutional layers 113 of the neural network and/or an output of the encoder 110. The sequence of values 119 can include, but not limited to, vector values or vectors. The sequence of values 119 can include or correspond to speech features 120 generated using the audio samples 108. The speech features 120 can include characteristics of the audio samples 108 and/or the user's voice, including but not limited to, temporal aspects, rhythm, pitch, tone, and/or a speed or rate of speech. The sequence of values 119 can be provided to a first input 131 of the decoder 130 of the device 102.

The device 102 can include a lookup table 122. The lookup table 122 can include a database, array or storage device maintaining a plurality of speaker embeddings 124. In some embodiments, the lookup table can be a component of storage device 106 of the device 102. The lookup table 122 can store and organize speaker embeddings 124 based in part on a user. For example, lookup table 122 can include a plurality of speaker embeddings 124 from each user that correspond to or include previous audio samples 108 provided to the device 102. The previous audio samples 108 can be used to train or further refine (e.g., improve) a quality of the speaker embeddings 124 for the particular user. In embodiments, the lookup table 122 can include an initial set of speaker embeddings 124 that include artificially generated audio samples 108 and/or audio samples 108 from a plurality of users and can be used to initially generate a new voice model 140 for a new user or user that does not have a voice model 140. The speaker embeddings 124 can be provided to a second input 133 of the decoder 130 of the device 102. In embodiments, the speaker embeddings 124 can be applied to (e.g., concatenated) to sequence of values 119 to generate a conditioning signal 125. The conditioning signal 125 can be provided to at least one input of the decoder 130.

The decoder 130 can include or be implemented in hardware, or at least a combination of hardware and software. For example, the decoder 130 can include a device, a circuit, software or a combination of a device, circuit and/or software to convert data (e.g., sequence of values 119, speaker embeddings 124, conditioning signal 125) from one format to a second different format. In some embodiments, the decoder 130 can include a neural network or be a component of a neural network to generate a voice model 140 that corresponds to or resembles the audio samples 108 of a user and/or the respective user's voice. The decoder 130 can include or form an autoregressive model that is conditioned using or based in part on outputs of one or more previous outputs from the encoder 110. The decoder 130 can include a neural network that includes at least two fully connected residual layers 132 and a normalization function 138. The decoder 130 can include a Wavenet decoder and can include a plurality of residual layers 132 (e.g., Wavenet layers). In embodiments, the decoder 130 can include multiple blocks each having multiple residual layers 132. For example, the decoder 130 can include four blocks of ten residual layers 132. In some embodiments, the decoder 130 can include four blocks of ten residual layers 132 and a resulting receptive field of a sample time period (e.g., 250 ms) for a determined number of samples. A top or final portion of the decoder 130 can include two fully connected layers 132 and a normalization function 138 (e.g., softmax activation). In embodiments, the decoder 130 can apply the normalization function 138 to an output of the plurality of residual layers 132 of the neural network of the decoder 130 to establish the voice model 140. The normalization function 138 can provide or generate probabilities for a quantized audio output 142 at a next or subsequent timeframe. The decoder 130 can provide the conditioning signal 125 (e.g., sequence of values 119, speaker embeddings 124) to the plurality of residual layers 132 to generate the voice model 140 for the user. In embodiments, the decoder 130 may include some elements of the device shown in FIG. 3 and subsequently described.

The residual layers 132 can include or correspond to components of a neural network of the decoder 130, for example, forming a residual neural network of the decoder 130. The residual layers 132 can include weights and/or biases that are provided to the inputs of the respective residual layer 132 to condition or train the decoder 130. The residual layers 132 can provide or pass their respective outputs to a next or subsequent residual layer 132 and also to one or more layers beyond the next or subsequent residual layer 132 through residual connections between the plurality of residual layers 132. For example, in some embodiments, the residual layers 132 can be connected such that a previous or first residual layer 132 provides or passes its output to a next, subsequent or second residual layer 132 and combines its output with the output of the output of the next, subsequent or second residual layer 132 to provide a combined output to a third residual layer 132 of the decoder 130. In some embodiments, the residual layers 132 can skip or provide or pass their respective outputs to one or more layers beyond a next or subsequent residual layer 132, thus skipping the next or subsequent residual layer 132 through skip connections (e.g., ResNet skip connections) between the plurality of residual layers 132. In embodiments, the skip connections can include nonlinearities (ReLU) and/or normalization functions 138 between the different residual layers 132.

The voice model 140 can include or correspond to a voice avatar, synthetic audio output 142 or synthetic audio sample. In embodiments, the voice model 140 can include or correspond to a neural network to convert a text input received or corresponding to a user, to a synthetic audio output 142 that resembles or sounds like the voice or speech of the respective user. The voice model 140 can include or be implemented in hardware, or at least a combination of hardware and software. For example, the voice model 140 can include a device, a circuit, software or a combination of a device, circuit and/or software to convert data (e.g., text input, text messages) from one format (e.g., text) to a second different format (e.g., audio). The voice model 140 can include or correspond to a digital clone (e.g., text to speech clone) of a user's voice used to read back or recite messages generated or input by the respective user. The voice model 140 can include unique voice embeddings or characteristics of the user's voice to generate a synthetic audio sample that resembles the user's voice. For example, the voice model 140 can include characteristics or properties of the speech of the user, such as but not limited to, volume, tone, pitch, length, temporal aspects, rhythm, and/or a speed or rate of speech.

The storage device 106 can include or correspond to a frame buffer or memory buffer of the device 102. The storage device 106 can be designed or implemented to store, hold or maintain any type or form of data associated with the device 102, the encoder 110, and the decoder 130. For example, the device 102, encoder 110 and/or decoder 130 can store one or more audio samples 108, sequence of values 119, speaker embeddings 124, conditioning signal 125 and/or voice model 140 in the storage device 106. The storage device 106 can include a static random access memory (SRAM) or internal SRAM, internal to the device 102. In embodiments, the storage device 106 can be included within an integrated circuit of the device 102.

The storage device 106 can include a memory (e.g., memory, memory unit, storage device, etc.). The memory may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor 104 via a processing circuit and includes computer code for executing (e.g., by the processing circuit and/or the processor) the one or more processes or methods (e.g., method 200) described herein.

Figure 2A:
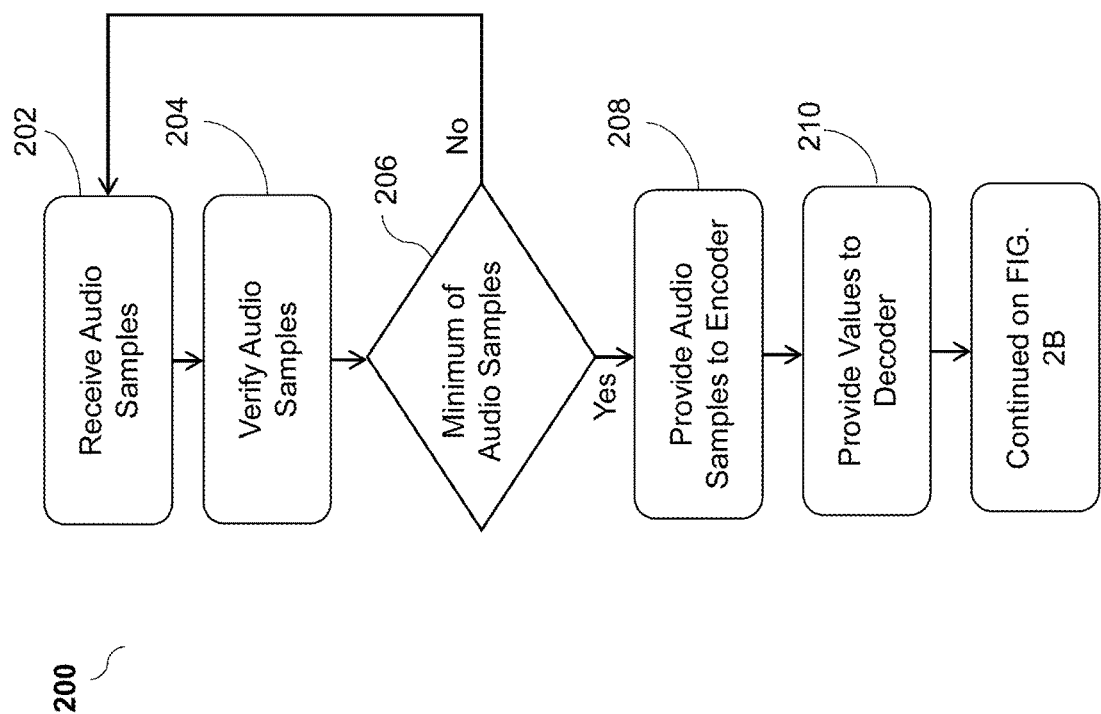
FIGS. 2A-2C include a flow chart illustrating a process or method for generating a voice model for a user, according to an example implementation of the present disclosure.
Figure 2B:
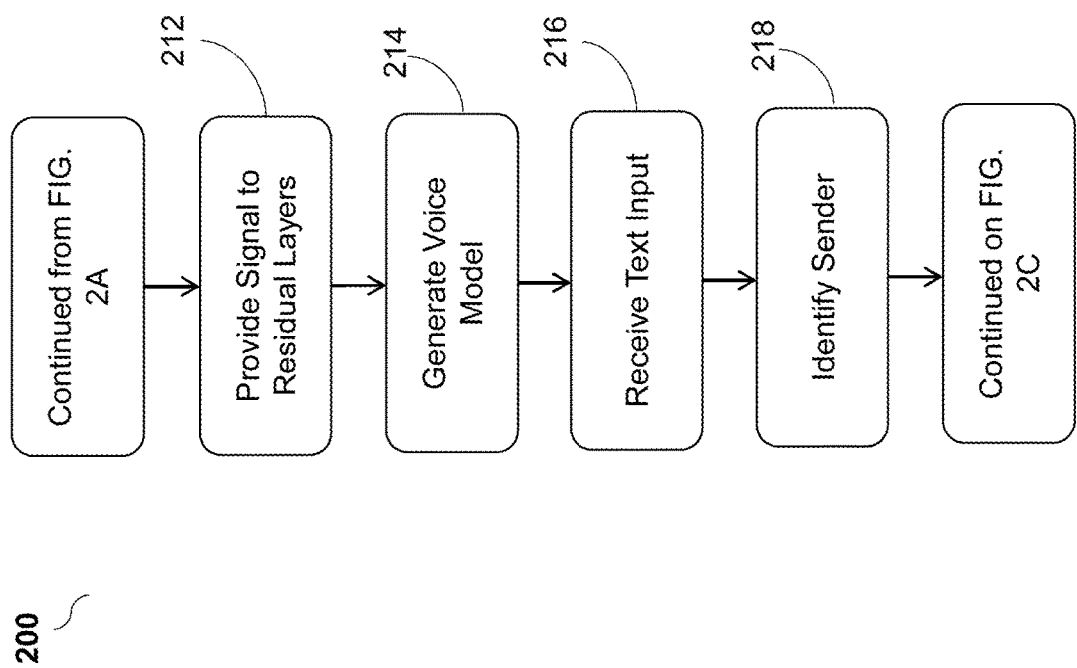
Figure 2C:
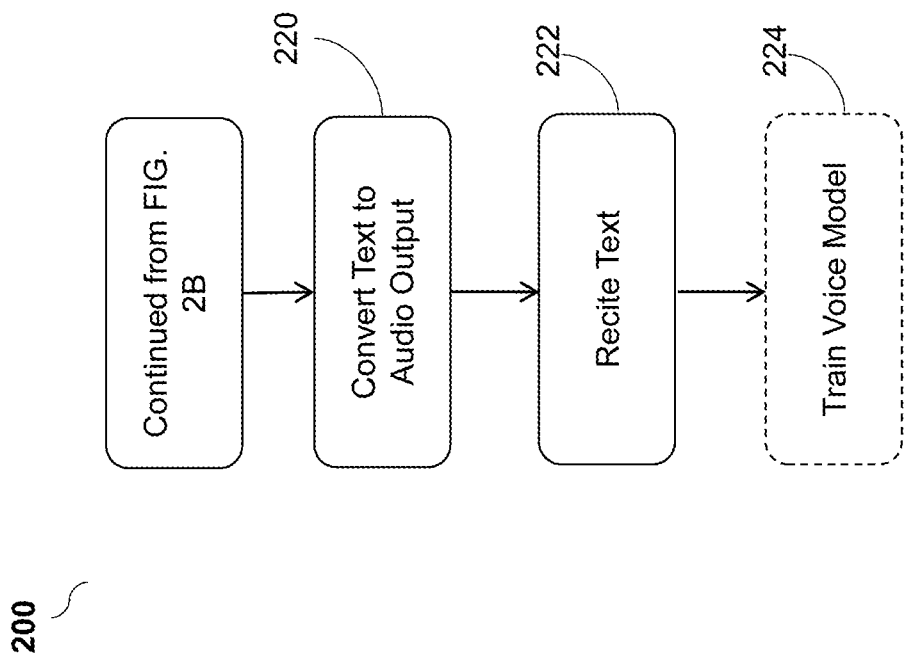

Now referring to FIGS. 2A-2C, a method 200 for generating a voice model is depicted. In brief overview, the method 200 can include one or more of: receiving a plurality of audio samples (202), verifying the audio samples (204), comparing the number of received audio samples to a threshold (206), if greater than the threshold, providing the audio samples to an encoder (208), providing values to a decoder (210), provide a conditioning signal to a plurality of residual layers (212), generating a voice model (214), receiving a text input (216), identifying the sender (218), converting the text input to an audio output (220), and reciting the text input as an audio output (222). Any of the foregoing operations may be performed by any one or more of the components or devices described herein, for example, the device 102, the processor 104, the encoder 110, and the decoder 130.

Referring to 202, and in some embodiments, a plurality of audio samples 108 can be received. In embodiments, a plurality of audio samples 108 can be received from a user at a first input 111 of a device 102. The user can opt into (e.g., authorize or activate) a recording mode on the device 102 to provide the audio samples 108. For example, the user can access or activate an application 107 executing on the device 102. The device 102 can include, but not limited to, a handheld device, computing device or mobile device of the user. The application 107 can be configured to provide a plurality of test sentences or phrases to the user. The user can opt in or agree to provide and generate a plurality of recordings to be used for generating a voice model 140. For example, the application 107 can ask for or provide a welcome screen or user interface requesting consent from the user for the application 107 to collect audio samples or acoustic data from user for the purpose of building a voice model 140 that resembles or is based in part on the user's voice. In some embodiments, the application 107 can provide a permission prompt or command window, that, responsive to a user interaction (e.g., click on, select), the user can consent to, agree or give permission to collect and record audio samples 108 from the user.

The application 107 can include or provide a privacy setting for the user to record and provide the audio samples 108. For example, when the user opts-in or selects to begin a recording session with the application 107, the application 107 can allow the user to establish and/or revise privacy settings to control and/or limit use and access to the audio samples 108. The user's privacy setting may specify that the audio samples 108 may only be used by the voice model 140 for text to speech conversion. For example, the user's privacy setting may allow or offer the user the ability to control what systems or applications of the device 102 can use and/or be provided the audio samples 108. The user's privacy setting may allow or offer the user the ability to block or prevent one or more systems or applications of the device 102 from accessing the audio samples 108. The user's privacy setting may specify that the audio samples 108 may be used only for a limited purpose (e.g., voice model 140, generating audio outputs 142), and further specify that the audio samples 108 may not be shared with any third-party system or used by other processes or applications associated with, connected to or executing on the device 102. The application 107 can begin the recording process after receiving consent from the user.

The application 107 can instruct the user to find a recording room to provide the audio samples 108. For example, the application 107 can instruct the user to find a quiet room or quiet place having no or minimal background noise or other forms of extraneous noise that can negatively impact the recording of the audio samples 108. The application 107 can provide the user, through the device 102, a plurality of test phrases for the user to recite back to a recording device of the device 102 or connected to the device 102. Test phrases as used herein can include, but not limited to, words, text, sentences, phrases and/or a set of utterances. The test phrases can be generated by the application. The application 107 can retrieve or receive the test phrases from a storage device 106 of the device 102. In certain embodiments, each user can be initially provided the same or similar test phrases to generate a voice model 140. In some embodiments, one or more users can be initially provided one or more different test phrases from one or more other users to generate a voice model 140. The test phrases can be randomly generated or generated by the user. For example, the application 107 can request or ask the user to speak a determined number of test phrases of the user's choice or own selection (e.g., speak freely, user selected words). The application 107 can request that the user read or speak back the test phrases and/or speak extemporaneously to generate the audio samples 108.

In embodiments, the application 107 can present or provide the test phrases to the user in a determined order or randomly. The application 107 can provide the test phrases one at a time and the user can recite or speak back the test phrases, for example, into the recording device (e.g., microphone, audio collection device) of the device 102 or connected to the first input 111 of the device 102. In embodiments, an audio sample 108 can correspond to or be associated with at least one test phrase, spoken word, spoken phrase or voice sample provided by the user. The device 102 and/or application 107 can instruct or request the user speak naturally, in a natural tone (e.g., read from a book, article or text message) or in a normal conversation voice. The user can be instructed to read the test phrases as the test phrases appear on the application. In embodiments, a microphone icon or other form of icon can be presented with each text phrase and the user can select or interact with the icon to begin recording the respective test phrase or the plurality of test phrases. The icon can change color or provide other forms of visual indication to the user that the device 102 and/or application 107 is active and recording.

Referring to 204, and in some embodiments, the plurality of audio samples 108 can be verified. In embodiments, a quality of the audio samples 108 can be verified by the application 107 or the device 102. The device 102 can determine the quality of the audio samples 108 based in part on different metrics (e.g., mean opinion score, heuristics) related to the properties of the audio samples 108. For example, the quality can include or correspond to a volume metric or a tone of a received audio sample 108. In embodiments, the application 107 can include or execute a volume unit (VU) meter. The VU meter can detect, monitor and indicate a volume level of a received audio sample 108. The VU meter can determine the volume level of a received audio sample and compare the volume level of the audio sample to a volume threshold. A volume level equal to or greater than the volume threshold can indicate a good quality or approved audio sample. A volume level less than the volume threshold can indicate a low quality, bad quality or not approved audio sample. The VU meter can verify the quality of an audio sample 108 as the respective audio sample 108 is received (e.g., one at a time) or the VU meter can verify the quality of one or more audio samples 108 after a determined number of audio samples are received.

In embodiments, the device 102 and/or application 107 can accept audio samples 108 having a volume level that is equal to or greater than the volume threshold and reject or ask the user to redo or re-record audio samples 108 having a volume level that is less than the volume threshold. The device 102 and/or application 107 can request the user to verify the quality of a received audio sample 108. For example, after reading a test phrase, the user can review or listen to the audio sample 108 by selecting or interacting with a play/review icon provided to the user through the application. For example, the application 107 can play back an audio sample 108 for the user to verify or aid in verifying (e.g., multiple verification process) the quality of the audio sample 108 provided. If the user makes a mistake or misreads the text phrase, or after reviewing the audio sample 108, the user determines to re-record the corresponding test phrase, the user can select the microphone icon to record the audio sample 108 again. In embodiments, the microphone icon can change color to provide a visual indicator to the user for the change from recording to recording stopped. For example, the microphone can change from a first color (e.g., red) to indicate active recoding to a second color (e.g., gray, green, blue) to indicate that the recording has stopped and the application 107 is waiting on a further interaction from the user (e.g., to approve audio sample, record next text phrase). The user can approve or otherwise verify the audio sample responsive to listening the respective audio sample 108. The user can select or interact with a next or continue icon provided to the user through the application 107 to read or record a next audio sample 108.

The application 107 can provide one or more indicators (e.g., visual, audio) to the user that an audio sample 108 is accepted or rejected. For example, the application 107 can provide a first visual indicator to the user having a first color (e.g., green) to indicate that an audio sample 108 is accepted and a second visual indicator to the user having a second color (e.g., red) to indicate that an audio sample 108 is rejected and should be redone. In embodiments, the application 107 can provide a first audio indicator to the user having a first sound to indicate that an audio sample 108 is accepted and a second audio indicator to the user having a second sound, that is different from the first sound, to indicate that an audio sample 108 is rejected and should be redone.

Referring to 206, and in some embodiments, the number of audio samples 108 can be compared to a sample threshold. The device 102 and/or application 107 can compare the number of audio samples 108 to a sample threshold or a total recording time of the audio samples 108 received to the sample threshold. In some embodiments, the sample threshold (e.g., test phrase threshold) can include or correspond to a number of test phrases or a length of recording time. For example, the sample threshold can include multiple test phrases (e.g., 10 test phrases, 20 test phrases). In embodiments, the sample threshold can include or correspond to minimum time value (e.g., 2 minutes of recording, 5 minutes of recordings) or a minimum runtime of recordings. The sample threshold can include a combination of a number of test phrases and a minimum time value. For example, the sample threshold can include a combination of text comprised of individual lines and/or paragraphs of phrases totaling at least a determined amount of runtime audio (e.g., 5 minutes, 10 minutes, or other length of time). The sample threshold can vary within or outside the sample numbers and/or time values provided herein.

In embodiments, the sample threshold can include or correspond to an initial threshold or initial level to generate a voice model 140 for a user. The sample threshold can increase or be adjusted to further refine and/or train the voice model with future or subsequent audio samples 108 received from a user, for example, after the voice model 140 for the user is initially generated. The device 102 can compare the number of audio samples 108 to the sample threshold to determine if the user has completed the recording phrase to generate the voice model 140. If the number of audio samples 108 is less than the sample threshold, method 200 can return to 202 to receive and/or request more audio samples. If the number of audio samples 108 is greater than or equal to the sample threshold, method 200 can move to 208. For example, the device 102 and/or application 107 can indicate to the user that the determined number of test phrases have been received and recorded and that the audio collection session is complete.

In embodiments, the device 102 and/or application 107 can provide a status indication (e.g., status bar) the user to indicate progress during a recording session to the meet the sample threshold or minimum requirements to generate a voice model 140. For example, the status indication can indicate, but not limited to, "2 of 30 test phrases completed" or "2 minutes of 5 minutes completed." The device 102 and/or application 107 can indicate through the application 107 to the user that the recording is complete and provide the user with a final opportunity to review and re-record one or more test phrases. For example, the application 107 can provide a screen or user interface displaying or showing that all test phrases have been completed with a playback icon next to each for the user to select and review before submitting the audio samples 108 to generate the voice model 140. In embodiments, the application 107 can provide the user a submit icon to submit the audio samples 108. The user can select the submit icon through the application 107 and be provided a success or completion message to indicate that the recording of the audio samples 108 is complete.

Referring to 208, and in some embodiments, the plurality of audio samples 108 can be provided to an encoder 110. The encoder 110, that includes a neural network, can receive a plurality of audio samples 108 from the user, for example, through the application 107 executing on the device 102. In embodiments, the encoder 110 can provide the plurality of audio samples 108 to the neural network to generate a sequence of values 119 corresponding to outputs from one or more convolutional layers 113 of the neural network.

The convolutional layers 113 can be components of a series of convolutional blocks 112 forming the neural network of the encoder 110. In some embodiments, the encoder 110 can include or operate using a filter (e.g., log-mel filterbank extracted from a 16 kHz speech signal, using a sliding window of 20 ms with hops of 10 ms) to sample or modify properties of the audio samples 108 for processing. For example, the encoder 110 can modify (e.g., reduce, downsample) a sampling rate of the audio samples 108 via at least one convolutional layer 113 of at least one convolutional block 112 of the neural network of the encoder 110 by a determined amount (e.g., by 2). The filtered signal or filtered audio samples 108 can be provided to the series of the convolutional blocks 112 having multiple convolutional layers 113. In embodiments, the convolutional blocks 112 can include a series of formed layers 113 (e.g., convolutional layers) with a residual connection adding a projection of the respective convolutional block 112 input to the respective convolutional block output 112. The convolutional layers 113 can include a plurality of weights and/or biases to process received audio samples 108. In embodiments, the convolutional layers 113 can include or correspond to a sequence of convolutional operations, batch normalization, clipped ReLU activations and/or a dropout to generate the sequence of values 119. For example, the convolutional layers 113 can convolve or take a dot product of spatial locations corresponding to or from the received audio sample 108 to generate a sequence of values 119 or modified audio samples 108 (e.g., different from the original or received form). In embodiments, the encoder 110 can include seven (or other number of) convolutional blocks 112 with each of the convolutional blocks 112 including five (or other number of) convolutional layers 113. The filtered audio samples 108 can be provided to the seven convolutional blocks 112 with each of the convolutional blocks 112 including five convolutional layers 113 to generate the sequence of values 119 corresponding to an output of the outputs from one or more convolutional layers 113 of the plurality of convolutional blocks 112.

Referring to 210, and in some embodiments, a sequence of values 119 can be provided to the decoder 130. The decoder 130 can receive, from the encoder 110, the sequence of values 119. In embodiments, the decoder 130 can receive the sequence of values 119 at a first input and receive one or more speaker embeddings 124 from a look up table 122 of the device 102 at a second input. The decoder 130 can apply the one or more speaker embeddings 124 of the user or associated with the user to the sequence of values 119 to generate a conditioning signal 125. The decoder 130 can provide the conditioning signal 125 to a plurality of residual layers 132 of the decoder to establish or generate the voice model 140.

The device 102 can include a look up table 122 (e.g., memory, storage) that stores and maintains speaker embeddings 124. The speaker embeddings 124 can include random or general speaker embeddings generated digitally through a synthetic or automated system (e.g., computerized), provided from a plurality of users, and/or speaker embeddings 124 provided by the target user. For example, during a first or initial setting, the decoder 130 can use or apply general speaker embeddings 124 provided by a plurality of users to initially establish a voice model 140 for a user. For subsequent or future sessions, the decoder 130 can use or apply speaker embeddings 124 provided by the user, for example, from one or more previous recording sessions, to establish, refine or train the voice model 140 for a user.

The speaker embeddings 124 can include embeddings (e.g., unique voice embeddings) from the target user. In embodiments, the speaker embeddings 124 can include portions of one or more audio samples 108 of the plurality of audio samples 108 or previously received audio samples 108 from the target user. The decoder 130 can apply or concatenate the speaker embeddings 124 to the sequence of values 119 to generate the conditioning signal 125 (e.g., concatenated signal, combined signal).

Referring to 212, and in some embodiments, the conditioning signal can be provided to a plurality of residual layers. The decoder 130 can include a neural network having a plurality of residual layers 132. In embodiments, the decoder 130 can include a neural network that includes at least two fully connected residual layers 132 and a normalization function 138. In some embodiments, the decoder can include four blocks of ten residual-layers and a resulting receptive field (e.g., 250 ms, 4,093 samples). In some embodiments, the decoder 130 can, prior to providing the conditioning signal 125 to the residual layers 132, modify a sampling rate (e.g., increase, upsample) of the conditioning signal 125 in a temporal domain determine or obtain an original audio rate for the conditioning signal 125 and/or prepare the conditioning signal 125 for processing in the residual layers 132.

The decoder 130 can provide the conditioning signal 125 to the plurality of residual layers 132 (e.g., WaveNet layers) to generate the voice model 140 corresponding to or resembling a voice of the user and/or or the plurality of audio samples 108 from the user. In some embodiments, the decoder 130 can provide the conditioning signal 125 to 1×1 convolutional layer at one or more of the residual layers 132. The final portion or last portion of the decoder 130 can include the two fully connected residual layers and the normalization function 138 (e.g., softmax activation). In embodiments, the normalization function 138 can perform a softmax activation on the output of the residual layers 132 to generate or provide probabilities for a quantized audio output 142 (e.g., 256 options) at a next or subsequent timeframe, or next or subsequent audio sample 108.

Referring to 214, and in some embodiments, a voice model 140 can be generated. The decoder 130 cam establish, using the sequence of values 119 and the one or more speaker embeddings 124, a voice model 140 corresponding to the plurality of audio samples 108 of the user. The decoder can generate the voice model 140 corresponding or resembling a voice of the target user and/or the plurality of audio samples 108 from the target user. The voice model 140 can correspond to a text to speech (TTS) digital clone, copy of the respective user's own voice or a voice avatar for the respective user. The voice model 140 can include or be implemented in hardware, or at least a combination of hardware and software. For example, the voice model 140 can include a device, a circuit, software or a combination of a device, circuit and/or software of the device 102 that can convert data (e.g., text input) from a text version to a second format, e.g., a synthetic audio output 142.

As the voice model 140 is established and generated using audio samples 108 from the respective user, the voice model 140 can include unique voice embeddings, characteristics and/or properties of the user's voice. For example, the voice model 140 can generate a synthetic audio output 142 having the unique voice embeddings, characteristics and/or properties of the user's voice, including but not limited to, volume, tone, pitch, length and/or speed of the user's voice.

In embodiments, the audio output 142 generated by the voice model 140 can sound like or resemble to corresponding user's own voice and still sound or be synthetic or artificial. For example, the voice model 140 can generate or provide a watermark to the audio output 142 generated for a particular user. The watermark can include or correspond to an audio watermark, electronic identifier or a psychological watermark embedded into the respective audio output 142 such that the audio output 142 generated for a user by the voice model 140 is recognizable as the respective user but unlikely to be confused with the users original voice. The voice model 140 can generate or embed the watermark (e.g., electronic identifier) into the audio output 142 for a user to a different person listening to the audio output 142 as the corresponding user.

In embodiments, the user can test or verify a quality of their voice model 140 and the audio outputs 142 generated by the voice model 140. For example, the device 102 can transmit a notification when the voice model 140 for the user is complete, for example, through an email message or text message or other form of communication. The user can open the application 107 of the device 102 to review and test the voice model 140. The application 107 can provide a user interface (e.g., text input window) for the user to provide a text or test phrase to the voice model 140. The user can provide a text input to the device 102 through the application 107. In embodiments, the user can speak or dictate a message to the device 102 through the application 107 to be converted into an audio output 142 by the voice model 140. The device 102 can provide the text (or dictated message) to the voice model 140 and the voice model 140 can convert the text into an audio output 142 that resembles the user's own voice. The application 107 can provide an approval window to the user for the user to approve the audio output 142 or reject the audio output 142. In embodiments, if the user rejects the audio output 142, the method 200 can move to 224 to train and/or refine the voice model 140. The device 102 can generate a plurality of voice models 140 for a plurality of users. For example, the device 102 can generate at least one unique voice model 140 for each user that submits or provides audio samples 108 to the device 102.

Referring to 216, and in some embodiments, a text input can be received. The device 102 of a first user can receive a text (e.g., text input, text message) from at least one different user or second user with a voice model 140 generated for the respective second user. The device 102 can establish the voice model 140 as a machine learning model. The device 102 can generate, using the voice model and input text from a user, a synthetic audio output 142 for the respective user that resembles or sounds like the respective users own voice. The voice model 140 can include automatic speech recognition features to identify and process audio samples 108 (e.g., human voice) to identify the corresponding person and/or generate an audio output 142 that resembles the voice of the respective person.

In embodiments, the first user can set or put the device 102 (e.g., mobile device) into a hands free or eyes free setting such that the first user can interact with the device 102 without touching or looking at the device 102. For example, the first user can put the device 102 into the hands free or eyes free setting for activities, such as driving, working out chatting in a group message, using a portal message, in a meeting and/or at a home setting. The device 102 can receive the text, and the device 102 can provide an audio indication that a message has been received. The audio indication can include a noise or sound. The audio indication can include a synthetic audio output 142 stating "message received" or similar phrasing. The first user can provide an audio response to the device 102 to "play the message." In embodiments, the first user can speak or talk into a microphone portion of the device 102 or an external microphone device connected to the device 102 to request that the message be played.

Referring to 218, and in some embodiments, a sender of the text input can be identified. The device 102 can identify the sender of the text. For example, the device 102 can compare a number (e.g., phone number) that the text was received from to a list of numbers or a list of contacts maintained by the device 102 in the storage 106 for the first user. In embodiments, the device 102 can use or extract one or more terms or words included in the text (e.g., person's name) to identify the sender of the text. The device 102 can use the sender's identity to identify the voice model 140 generated for the sender (e.g., the second user). For example, the device 102 cam use the sender's identity (e.g., name, phone number, email) to search the storage for a voice model 140 generated for the second user.

Referring to 220, and in some embodiments, the text input can be converted to an audio output 142. The device 102 can convert, using the voice model 140 and the at least one of the one or more speaker embeddings 124, the input text to a synthetic audio output 142 to model a voice of the second user. For example, the device 102 can execute the voice model 140 for the second user and provide as inputs to the voice model 140, the received text and one or more speaker embeddings corresponding to or from the second user. The voice model 140 for the second user can convert the text to speech, apply the speaker embeddings to the converted speech and generate a synthetic audio output 142 for the second user.

Referring to 222, and in some embodiments, the text input can be recited as an audio output 142. The device 102 of the first user can recite or read the received text from the second user as the synthetic audio output 142 corresponding to or resembling the second users voice. In embodiments, the device 102 can recite each word, phrase or sentence included in the received text using the synthetic audio output 142 corresponding to or resembling the second user's voice and generated by the voice model 140 for the second user. The device 102 can embed or include a watermark in the synthetic audio output 142 such that the synthetic audio output 142 sounds like or resembles the second user's voice and recognizable to the first user listening to the synthetic audio output 142. The device 102 can embed or include a watermark in the synthetic audio output 142 such that the synthetic audio output 142 sounds like or resembles the second users voice and is distinguishable from the second user's own or actual voice.

In embodiments, the first user can return a message to the second user through the device 102 and in response to the received text. For example, the device 102 can receive an audio response from the first user and generate or convert the audio response to a text. The device 102 can transmit the converted text to the second user or sender of the first text through the conversation (e.g., text conversation) the first text was received. In a group chat or group conversation, the device 102 can transmit the converted text to the second user or sender of the first text through the group conversation or to only the second user, based in part on an command or indication from the first user (e.g., "transmit to group message," "transmit to second user only"). The device 102 can continue the communication session or conversation between the first user and the second user until the first user indicates the communication session is over, for example, through an audio indication (e.g., stating "end call") or after a determined time period (e.g., 20 seconds, 30 seconds) with no interaction, received text and/or received audio inputs from either party.

Referring to 224, and in some embodiments, the voice model 140 can be trained. In embodiments, the device 102 can train or further refine the speaker embeddings 124 for a user and/or the voice model 140 for the user. For example, the device 102 can generate the voice model 140 as a machine learning model such that as the machine learning model receives more or additional data points (e.g., audio samples, speaker embeddings), the machine learning model can refine the voice model 140 and the synthetic audio outputs 142 generated by the voice model 140. In embodiments, the decoder 130 can train the voice model 140 for the user using the one or more speaker embeddings 124 and one or more subsequent audio samples from the user.

In embodiments, the device 102 and/or application 107 can invite or ask the user to provide more data (e.g., additional audio samples 108, speaker embeddings 124) to train, refine and/or improve the user's voice model 140. The application 107 can play one or more sample audio outputs 142 generated by the voice model 140 for the user to check a quality of the voice model 140 and audio samples 108. In embodiments, the user can request to provide more audio samples 108 to the device 102. The method 200 can return to 202 for the user to opt in or open the application 107 on the device 102 to provide audio samples 108. The decoder 130 can apply or concatenate the speaker embeddings 124 with the subsequent or newly received audio samples 108 from the user to train and/or refine the voice model 140 for the user.

The device 102 and/or decoder 130 can provide the one or more subsequent audio samples 108 from the user to a first residual layer 132 and a second residual layer 132 of a neural network of the decoder 130. The device 102 and/or decoder 130 can provide the one or more speaker embeddings 124 to the first residual layer 132 and the second residual layer 132 of the neural network of the decoder 130. In embodiments, an output from the first residual layer 132 can be provided to an input of the second residual layer 132 to train the voice model 140 for the user. For example, the decoder 130 can improve one or more properties of audio outputs 142 generated by the voice model 140 for a user, including but not limited to, volume, tone, pitch, length, temporal aspects, rhythm, and a speed or rate of speech of the generated audio outputs 142 for the user. In embodiments, an accuracy or quality of the voice model 140 and audio outputs 142 generated by the respective voice model 140 can increase and/or improve as the corresponding user provides more and more audio samples 108.

B. Computing System

Various operations described herein can be implemented on computer systems. FIG. 3 shows a block diagram of a representative computing system 314 usable to implement the present disclosure. In some embodiments, the device 102, encoder 110 or decoder 130 of FIG. 1 are implemented by the computing system 314. Computing system 314 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation.

Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
receiving, by an encoder that comprises a neural network, a plurality of audio samples of a user;
generating, by the encoder according to the plurality of audio samples, a sequence of values corresponding to speech features of the plurality of audio samples;
receiving, by a decoder from the encoder, the sequence of values;
establishing, by the decoder using the sequence of values and one or more speaker embeddings of the user, a voice model, the one or more speaker embeddings including artificially generated audio samples of the user; and
generating, by the voice model, a synthetic audio output including the speech features, the synthetic audio output distinguishable from a vocal output of the user.

2. The method of claim 1, further comprising:
establishing the voice model as a machine learning model;
receiving, by the voice model, input text; and
generating, by the voice model, the synthetic audio output resembling the user reciting the input text.

3. The method of claim 1, further comprising:
receiving input text from the user;
determining the user that provided the input text;
identifying the voice model for the determined user and at least one of the one or more speaker embeddings of the determined user; and
converting, using the voice model and the at least one of the one or more speaker embeddings, the input text to the synthetic audio output resembling the user reciting the input text.

4. The method of claim 1, further comprising:
applying, by the decoder, the one or more speaker embeddings of the user to the sequence of values to generate a conditioning signal; and
providing, by the decoder, the conditioning signal to a plurality of residual layers to establish the voice model.

5. The method of claim 1, further comprising modifying, by the encoder, a sampling rate of the plurality of audio samples via at least one convolutional layer of at least one convolutional block of the neural network of the encoder.

6. The method of claim 1, further comprising:
providing one or more subsequent audio samples of the user to a first residual layer and a second residual layer of a neural network of the decoder; and
providing the one or more speaker embeddings to the first residual layer and the second residual layer of the neural network of the decoder, wherein an output from the first residual layer is provided to an input of the second residual layer to train the voice model for the user.

7. The method of claim 1, wherein the decoder includes a neural network that includes at least two fully connected residual layers and a normalization function.

8. The method of claim 1, further comprising applying, by the decoder, a normalization function to an output of a plurality of residual layers of a neural network of the decoder to establish the voice model.

9. A device comprising:
an encoder implemented using at least one processor, the encoder configured to:
receive a plurality of audio samples of a user; and
provide the plurality of audio samples to a neural network of the encoder to generate outputs from one or more convolutional layers of the neural network as a sequence of values corresponding to speech features of the plurality of audio samples;
a decoder implemented using the at least one processor, the decoder configured to:
receive, from the encoder, the sequence of values; and
establish, using the sequence of values and one or more speaker embeddings of the user, a voice model, the one or more speaker embeddings including artificially generated audio samples of the user; and
the voice model configured to generate a synthetic audio output including the speech features, the synthetic audio output distinguishable from a vocal output of the user.

10. The device of claim 9, wherein the device is further configured to:
establish the voice model as a machine learning model;
receive, by the voice model, input text; and
generate, by the voice model, the synthetic audio output resembling the user reciting the input text.

11. The device of claim 9, wherein the device is further configured to:
receive input text from the user;
determine the user that provided the input text;
identify the voice model for the determined user and at least one of the one or more speaker embeddings of the determined user; and
convert, using the voice model and the at least one of the one or more speaker embeddings, the input text to the synthetic audio output resembling the user reciting the input text.

12. The device of claim 9, wherein the decoder is further configured to:
apply the one or more speaker embeddings of the user to the sequence of values to generate a conditioning signal; and
provide the conditioning signal to a plurality of residual layers to establish the voice model.

13. The device of claim 9, wherein the encoder is further configured to:
modify a sampling rate of the plurality of audio samples via at least one convolutional layer of at least one convolutional block of the neural network of the encoder.

14. The device of claim 9, wherein the device is further configured to:
provide one or more subsequent audio samples of the user to a first residual layer and a second residual layer of a neural network of the decoder; and
provide the one or more speaker embeddings to the first residual layer and the second residual layer of the neural network of the decoder, wherein an output from the first residual layer is provided to an input of the second residual layer to train the voice model for the user.

15. A non-transitory computer readable medium storing instructions when executed by one or more processors cause the one or more processors to:
receive a plurality of audio samples of a user;
provide the plurality of audio samples to a neural network to generate outputs from one or more convolutional layers of the neural network as a sequence of values corresponding to speech features of the plurality of audio samples; and
establish, using the sequence of values and one or more speaker embeddings of the user, a voice model, the one or more speaker embeddings including artificially generated audio samples of the user; and generate, through the voice model, a synthetic audio output including the speech features, the synthetic audio output distinguishable from a vocal output of the user.

16. The non-transitory computer readable medium of claim 15, further comprising instructions when executed by the one or more processors further cause the one or more processors to:

establish the voice model as a machine learning model; and generate, using the voice model and input text, the synthetic audio output resembling the user reciting the input text.

17. The method of claim 1, wherein the speech features include at least one of temporal aspects, rhythm, pitch, tone, or a rate of speech.

18. The method of claim 1, wherein a speaker embedding of the one or more speaker embeddings of the user includes a portion of an audio sample of the plurality of audio samples.

19. The method of claim 1, further comprising:

embedding, by the voice model, a watermark in the synthetic audio output, the watermark including an electronic identifier to distinguish the synthetic audio output from the vocal output of the user.

20. The device of claim 9, wherein the voice model is configured to embed a watermark in the synthetic audio output, the watermark including an electronic identifier to distinguish the synthetic audio output from the vocal output of the user.

\* \* \* \* \*